(12) United States Patent
Langlais et al.

(10) Patent No.: US 9,377,054 B2
(45) Date of Patent: Jun. 28, 2016

(54) FLUID SEAL FOR A ROTATING ASSEMBLY

(71) Applicant: Seagate Technology LLC, Cupertino, CA (US)

(72) Inventors: Timothy Edward Langlais, Minneapolis, MN (US); Daniel Dennis Dittmer, Shakopee, MN (US); Troy M. Herndon, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 9 days.

(21) Appl. No.: 14/281,544

(22) Filed: May 19, 2014

(65) Prior Publication Data

US 2015/0330453 A1 Nov. 19, 2015

(51) Int. Cl.
*F16C 32/06* (2006.01)
*F16C 33/76* (2006.01)
*F16C 43/04* (2006.01)

(52) U.S. Cl.
CPC .............. *F16C 33/763* (2013.01); *F16C 33/76* (2013.01); *F16C 43/04* (2013.01); *F16C 43/045* (2013.01); *Y10T 29/49641* (2015.01)

(58) Field of Classification Search
CPC ........ F16F 33/10; F16C 33/72; F16C 33/664; F16C 33/745; F16C 33/1035; F16C 33/1045; F16C 2370/12; F16C 33/7816; F16J 15/40; F16J 15/54; H02K 7/083
USPC ......... 384/100, 107, 133, 119, 446, 462, 478, 384/488, 490, 504, 517, 130, 138, 473; 310/67 R, 90, 99.08; 277/302, 410; 29/898.02
See application file for complete search history.

(56) References Cited

U.S. PATENT DOCUMENTS

| | | | | |
|---|---|---|---|---|
| 4,673,997 A * | 6/1987 | Gowda | ................ | F16C 33/1035 252/62.52 |
| 5,011,165 A | 4/1991 | Cap | | |
| 5,051,853 A * | 9/1991 | Hosoya | ................ | F16J 15/43 277/347 |
| 5,057,952 A * | 10/1991 | Takahashi | ................ | F16J 15/43 277/410 |
| 5,108,198 A * | 4/1992 | Nii | ................ | F16C 33/1035 277/410 |
| 5,267,737 A * | 12/1993 | Cossette | ................ | F16J 15/43 277/410 |
| 5,600,511 A | 2/1997 | Dunfield et al. | | |
| 5,757,097 A * | 5/1998 | Sato | ................ | F16C 17/22 310/90 |
| 5,821,646 A * | 10/1998 | Chuta | ................ | H02K 5/124 310/67 R |
| 5,876,037 A * | 3/1999 | Ishizaki | ................ | F16J 15/43 277/302 |
| 6,052,257 A * | 4/2000 | Branger | ................ | G11B 25/043 310/67 R |
| 6,229,676 B1 | 5/2001 | Prater | | |

(Continued)

FOREIGN PATENT DOCUMENTS

| | | | | |
|---|---|---|---|---|
| CN | 2793417 Y | 7/2006 | | |
| DE | 102008033167 A1 * | 1/2010 | ............ | F16C 17/107 |
| JP | H01237957 A | 9/1989 | | |

*Primary Examiner* — Marcus Charles
(74) *Attorney, Agent, or Firm* — Westman, Champlin & Koehler, P.A.

(57) ABSTRACT

A fluid seal for sealing a gap region for rolling elements rotationally connecting a shaft and an outer structure of a rotating assembly. In embodiments described, the fluid seal includes an inner capillary seal and an outer capillary seal radially and axially spaced from the inner capillary seal. The inner and outer capillary seals are formed along a passageway having an axial portion and a radial portion formed along capillary surfaces of a fluid seal structure and opposed transverse and upright surfaces. In embodiments disclosed, the fluid seal structure includes a seal ring and cap or a seal plate structure. In another embodiment, a flange portion of the shaft forms the fluid seal structure.

20 Claims, 9 Drawing Sheets

(56) References Cited

U.S. PATENT DOCUMENTS

| | | | |
|---|---|---|---|
| 6,305,694 B1 * | 10/2001 | Yamazumi | F16J 15/43 277/410 |
| 6,421,201 B1 * | 7/2002 | Khan | G11B 19/2009 360/97.15 |
| 6,558,042 B1 * | 5/2003 | Tompkins | F16C 33/765 277/410 |
| 6,671,125 B1 | 12/2003 | Sumi | |
| 6,679,501 B1 | 1/2004 | Pelstring et al. | |
| 7,073,945 B2 | 7/2006 | Aiello et al. | |
| 7,284,910 B2 * | 10/2007 | Dittmer | F16C 33/103 384/119 |
| 7,517,153 B2 * | 4/2009 | Engesser | F16C 17/10 384/107 |
| 2002/0130470 A1 | 9/2002 | Machida | |
| 2002/0158529 A1 | 10/2002 | Liu et al. | |
| 2004/0091188 A1 * | 5/2004 | Aiello | F16C 33/107 384/119 |
| 2005/0015791 A1 * | 1/2005 | Herndon | F16C 17/026 720/695 |

* cited by examiner

FLUID SEAL FOR A ROTATING ASSEMBLY

SUMMARY

The present application relates to a fluid seal for a rotating assembly to contain lubricant or grease for the bearing elements. In embodiments described, the fluid seal includes an inner capillary seal and an outer capillary seal radially and axially spaced from the inner capillary seal. The inner and outer capillary seals are formed along a passageway having an axial portion and a radial portion. In embodiments described, the inner capillary seal is formed along capillary surfaces along the radial portion of the passageway and the outer capillary seal is formed along capillary surfaces along the axial portion of the passageway. As shown, a fluid path connects the inner capillary seal to the outer capillary seal to seal a gap region of a bearing structure. In illustrated embodiments, the capillary surfaces are formed along a fluid seal structure and opposed transverse and upright surfaces. In embodiments disclosed, the fluid seal structure includes a seal ring and cap or a seal plate structure. In one embodiment, a flange portion of a shaft of the rotating assembly forms the fluid seal structure of the fluid seal. Other features and benefits that characterize embodiments of the present invention will be apparent upon reading the following detailed description and review of the associated drawings.

DETAILED DESCRIPTION OF ILLUSTRATIVE EMBODIMENTS

The present application relates to a fluid seal for a rotating assembly having an outer structure coupled to a shaft through a bearing assembly. The bearing assembly uses a lubricant film or grease to lubricant one or more rolling elements of the bearing assembly. In illustrated embodiments, the fluid seal is used to contain the lubricant film or grease to limit outgassing of lubricant and contaminates from the bearing assembly. Embodiments of the fluid seal are illustrated schematically in FIGS. 1A-1F, FIGS. 2A-2B and FIGS. 3A-3B of the application.

Figure 1A:
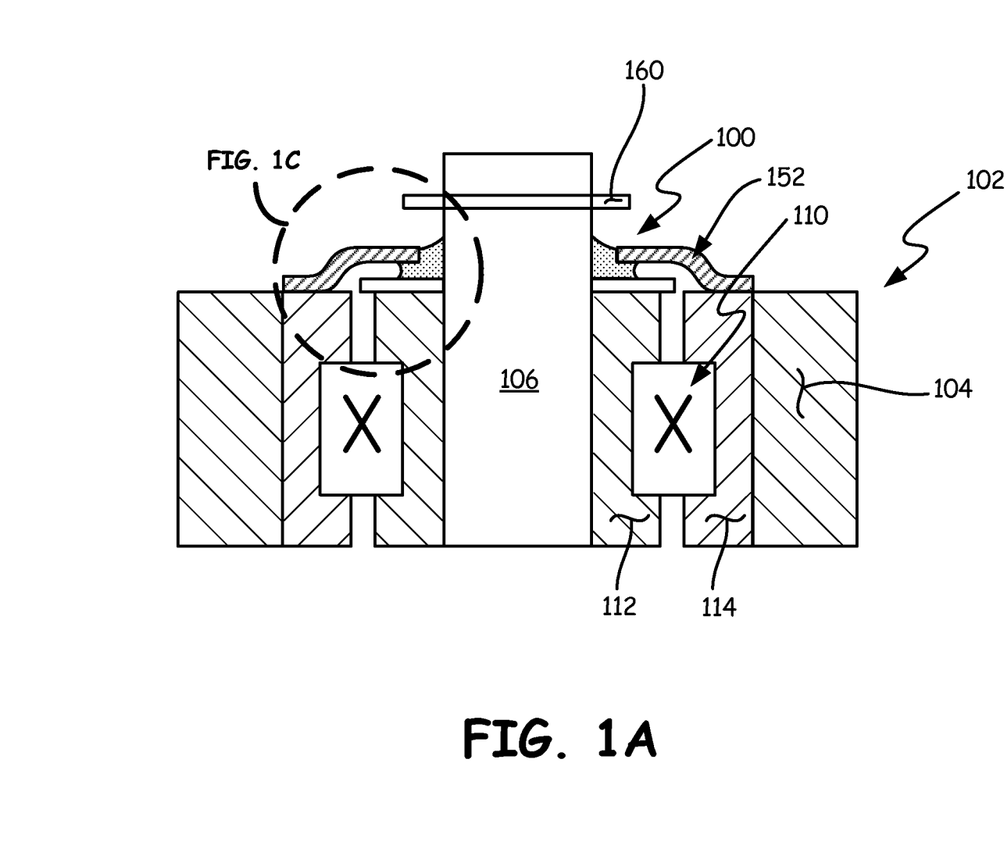
FIG. 1A schematically illustrates a rotating assembly including a fluid seal according to one embodiment of the present application.
Figure 1B:
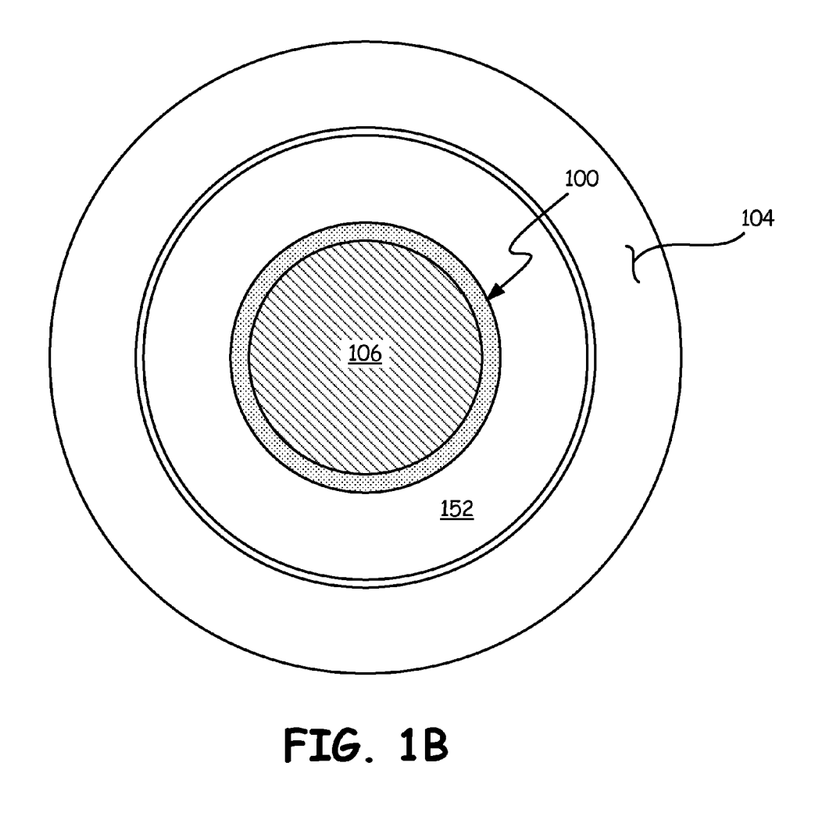
FIG. 1B is a top view of the fluid seal and rotating assembly shown in FIG. 1A.

FIGS. 1A-1B schematically illustrate one embodiment of the fluid seal 100 for rotating assembly 102. As shown, outer structure 104 is coupled to shaft 106 through a bearing structure 110 (illustrated schematically). The bearing structure 110 includes a plurality of rolling elements (illustrated schematically in FIGS. 1A-1B) disposed between an inner race 112 coupled to the shaft 106 and an outer race 114 coupled to the outer structure 104. The rolling elements are supported and rotate in a gap region between the inner race 112 and the outer race 114 to facilitate rotation between the outer structure 104 and the shaft 106. Illustratively, the rolling elements include balls or cylindrical rollers to facilitate rotation between the outer structure 104 and the shaft 106. In one exemplary embodiment, the shaft 106 is stationary and the outer structure 104 rotates about the stationary shaft. In another exemplary embodiment, the outer structure 104 is stationary and the shaft 106 rotates. Various arrangements are possible.

As previously disclosed, lubricant material is disposed in the gap region between the inner race 112 and outer race 114 to lubricate the rolling elements. The fluid seal 100 is used to contain lubricant and other debris in the gap region between the inner race 112 and the outer race 114 to prevent outgassing. As shown in more detail in FIG. 1C, the fluid seal 100 includes an inner capillary seal 120 and an outer capillary seal 122 and a fluid path 124 between the inner capillary seal 120 and outer capillary seal 122. The outer capillary seal 122 is radially and axially spaced from the inner capillary seal 120 to form a low profile fluid seal 100 that limits outgassing from the bearing structure 110. As shown, the inner and outer capillary seals 120, 122 are formed along a passageway 126 having an inlet proximate to the gap region and an outlet radially and axially spaced from the inlet. The passageway 126 is formed via surfaces of a fluid seal structure and the rotating assembly. In the illustrated embodiment, the passageway 126 includes a radial portion 130 formed between an inner capillary surface 134 of the fluid seal structure and a generally transverse surface 136 forming a capillary surface along a transverse surface of the bearing structure 110. The passageway 126 also includes an axial portion 140 formed between an outer capillary surface 142 of the fluid seal structure and a capillary surface formed along an upright surface 144 of the shaft 106. As described upright refers to an axial orientation and transverse refers to a radial orientation generally perpendicular to the axial orientation.

Figure 1C:
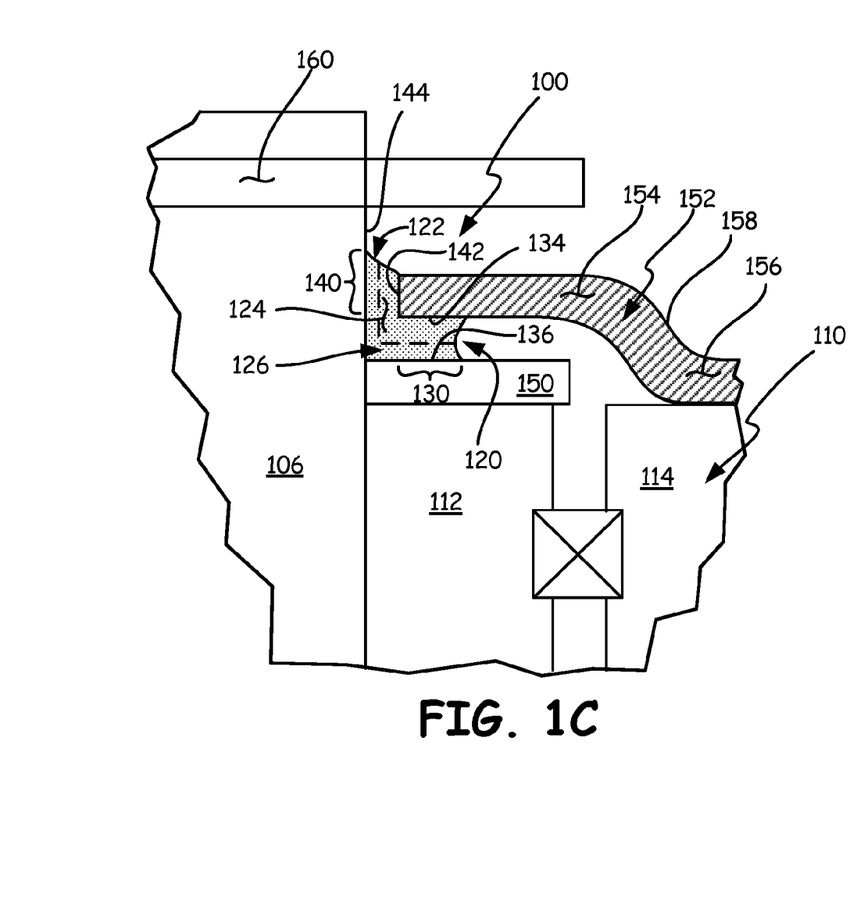
FIG. 1C is a detailed illustration of portion 1C of the fluid seal illustrated in FIG. 1A.
Figure 1D:
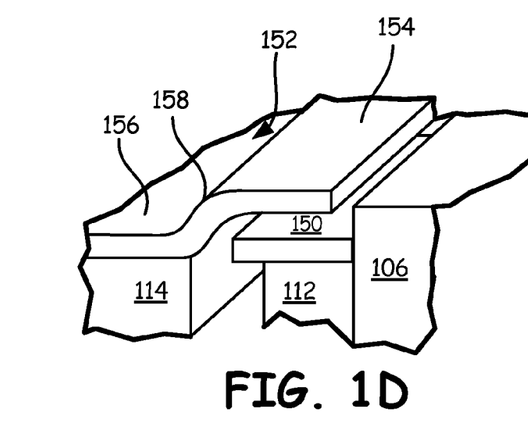
FIG. 1D illustrates a seal ring and cap forming a passageway for the fluid seal of FIGS. 1A-1B.

In the embodiment shown in FIGS. 1C-1D, the fluid seal structure includes multiple components including a seal ring 150 and conical shaped cap 152. As shown in FIGS. 1C-1D, the conical shaped cap 152 includes a raised inner portion 154 and an outer rim portion 156 about the raised inner portion 154. As shown, a sloped transition portion 158 connects the raised inner portion 154 and the outer rim portion 156. As shown in FIGS. 1C-1D, the seal ring 150 is assembled on the inner race 112 to form the transverse capillary surface 136 of the passageway 126. The cap 152 is assembled over the bearing structure 110 so that the rim portion 156 abuts the outer race 114. As shown, an underside surface of the raised inner portion 154 is spaced from the transverse surface 136 along the seal ring 150 to form the inner capillary surfaces 134, 136 along the radial portion 130 of the passageway 126. In the embodiment shown, the inner capillary surface 134 formed via the fluid seal structure is orientated in a radial direction. An inner perimeter surface of the cap 152 is spaced from the upright surface 144 to form the outer capillary surfaces 142, 144 along the axial portion 140 of the passageway 126. In the illustrated embodiment, the outer capillary surface 142 formed via the fluid seal structure is orientated in an axial direction.

Figure 1E:
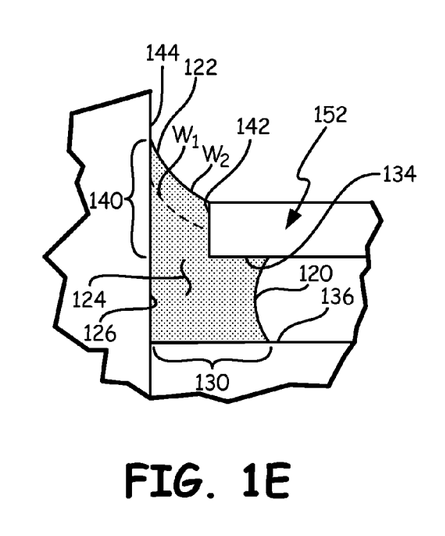
FIG. 1E is a detailed illustration of the inner and outer capillary seals of an embodiment of the fluid seal.

The fluid seal is formed of a viscous fluid, which is deposited through the inlet into the passageway 126. The deposited fluid forms the inner capillary seal 120 between an undersurface of the cap 152 and the transverse surface 136 of the seal ring 150 and the outer capillary seal 122 between the inner perimeter surface of the cap 152 and the upright surface 144 of the shaft 106. The fluid of the seal is formed of a non-magnetic or non-ferromagnetic fluid and is sealed using capillary forces imparted to the fluid via surface friction or tension along the passageway 126 surfaces. The viscous fluid extends along the passageway 126 to form the fluid path 124 having an axial length and a radial length as shown by dashed lines in FIG. 1C. In an illustrated embodiment, the upright surface 144 of the shaft 106 extends above the outer capillary surface 142 formed along the inner perimeter surface of the cap 152 to provide an increasing meniscus width $w_2 > w_1$ for the outer capillary seal 122 as schematically shown in FIG. 1E. As shown, the width of radial portion 130 of the passageway 126 is wider than the axial portion 140 to balance the meniscus width of the inner and outer capillary seals 120, 122. As described, the structure of the passageway 126 and inner and outer capillary seals 120, 122 provide a low profile fluid seal to limit axial height requirements for sealing the bearing structure 110 of an assembly. In the embodiment shown in FIGS. 1A and 1C, a protective sleeve 160 is assembled over the fluid seal 100 above cap 152 to restrict interference with the fluid seal 100 during assembly of the rotating assembly 102.

Figure 1F:
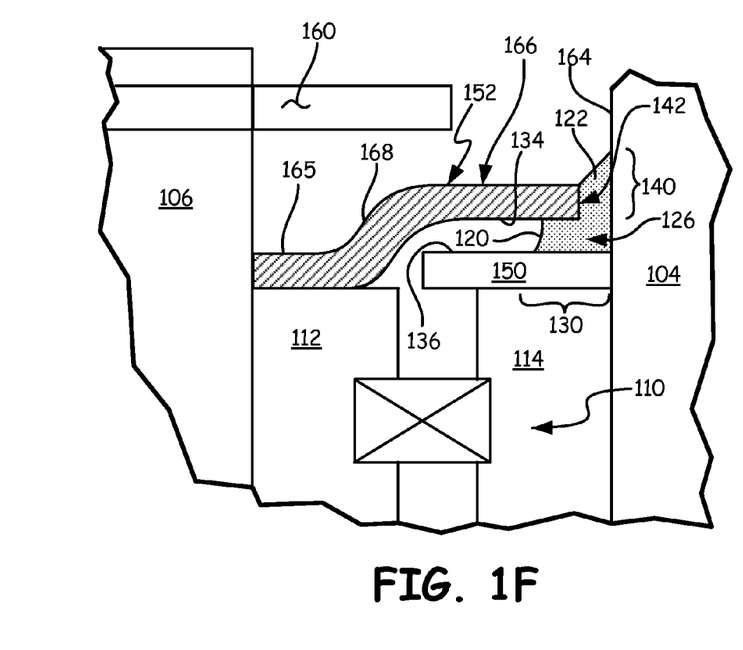
FIG. 1F schematically illustrates another embodiment of a rotating assembly including a fluid seal formed along an outer structure of the rotating assembly.

FIG. 1F illustrates an alternate embodiment of a fluid seal 100 for sealing a bearing structure 110 having a plurality of rolling elements as previously described. In the embodiment shown in FIG. 1F, the outer capillary seal 122 is formed between the fluid seal structure and an upright surface 164 on the outer structure 104 and the inner capillary seal 120 is formed between the fluid seal structure and transverse surface 136. Similar to the embodiment shown in FIGS. 1A-1D, the fluid seal structure includes a seal ring 150 and cap 152 which cooperatively form the radial portion 130 and axial portion 140 of the passageway 126. In the embodiment illustrated in FIG. 1F, the cap 152 includes an inner portion 165 and a raised outer portion 166 coupled to the inner portion through a sloped transition portion 168.

The inner capillary seal 120 is formed along the inner capillary surfaces along the radial portion 130 of the passageway 126. As shown, the inner portion 165 of cap 152 rests on a transverse surface of the inner race 112. The raised outer portion 166 is spaced from the transverse surface 136 along the seal ring 150 to form the inner capillary surface 134 of the fluid seal structure along the radial portion 130 of the passageway 126. The outer capillary seal 122 is formed along the outer capillary surfaces along the axial portion 140 of the passageway 126. As shown, the outer perimeter surface of the raised outer portion 166 of cap 152 is spaced from the upright surface 164 of the outer structure 104 to form the outer capillary surface of the fluid seal structure along the axial portion 140 of the passageway 126.

Figure 2A:
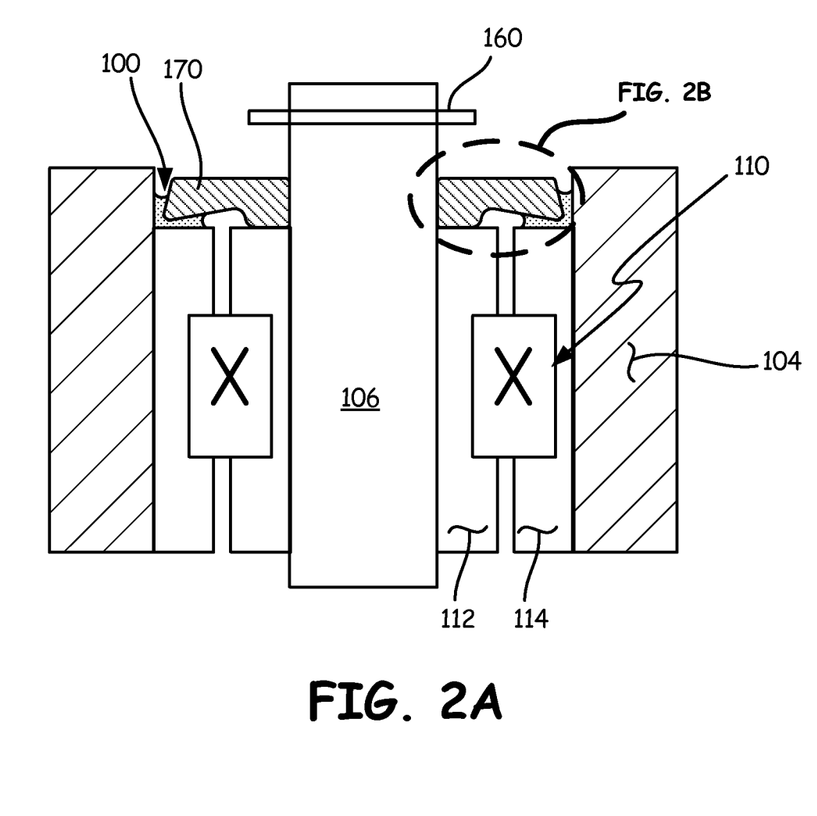
FIG. 2A schematically illustrates another embodiment of a fluid seal of the present application.
Figure 2B:
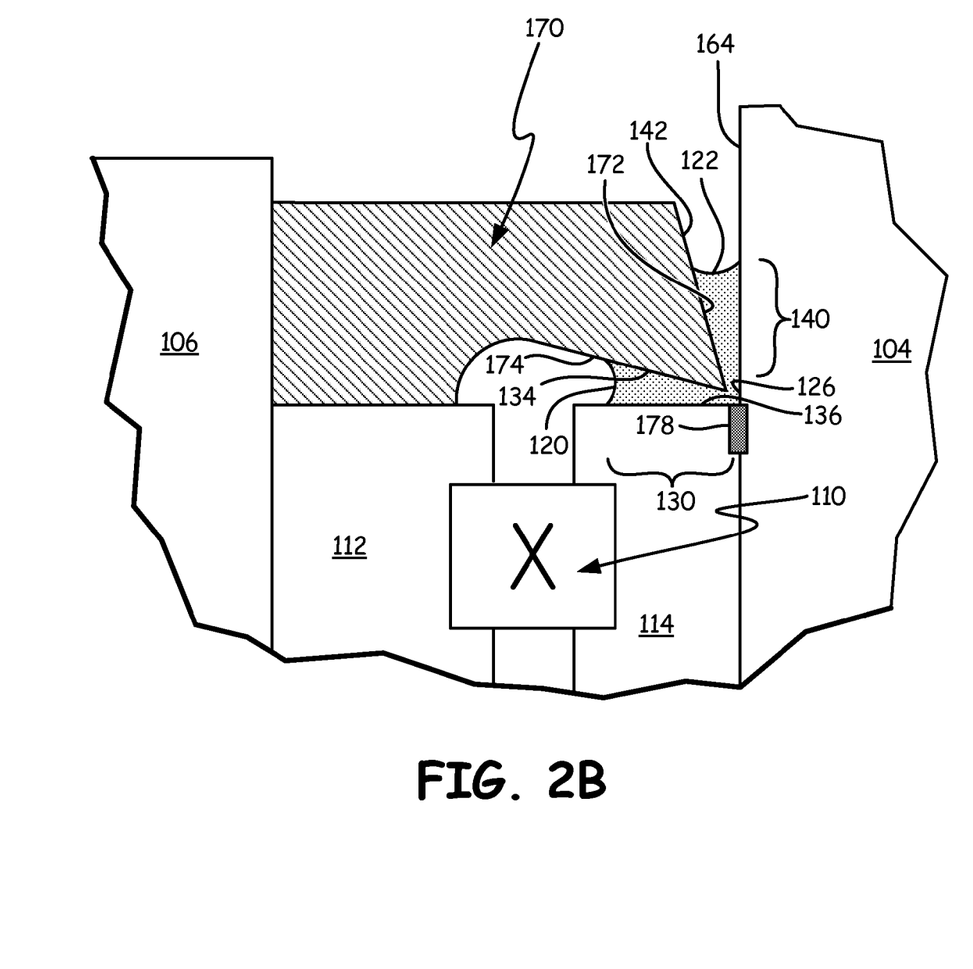
FIG. 2B is a detailed illustration of portion 2B of the embodiment of the fluid seal illustrated in FIG. 2A.

In another embodiment illustrated in FIGS. 2A-2B the fluid seal structure includes seal plate 170 having an inner aperture sized for insertion over the shaft 106 to form the passageway 126 having an axial portion 140 and a radial portion 130 as previously described with respect to FIGS. 1A-1F. As shown in more detail in FIG. 2B, an outer perimeter of the seal plate 170 includes a tapered surface 172 forming the outer capillary surface 142 of the fluid seal structure along the axial portion 140 of the passageway 126. An outer portion of the seal plate 170 includes a notch cut into an underside of the plate 170 to form a tapered undersurface 174. The tapered undersurface 174 is spaced from and opposes transverse surface 136 to form the inner capillary surface 134 of the fluid seal structure along the radial portion 130 of the passageway 126.

An inward portion of the seal plate 170 rests on the inner race 112 of the bearing structure 110. Thus as shown, the axial portion 140 of the passageway is formed between the tapered perimeter surface 172 and the upright surface 164 of the outer structure 104 and the radial portion 130 is formed via the tapered undersurface 174 and transverse surface 136 along the outer race 114. As shown, a gap between the outer race 114 and outer structure 104 is sealed via an adhesive seal 178 to restrict seepage of the seal fluid from the passageway 126 between the outer race 114 and the outer structure 104.

Figure 3A:
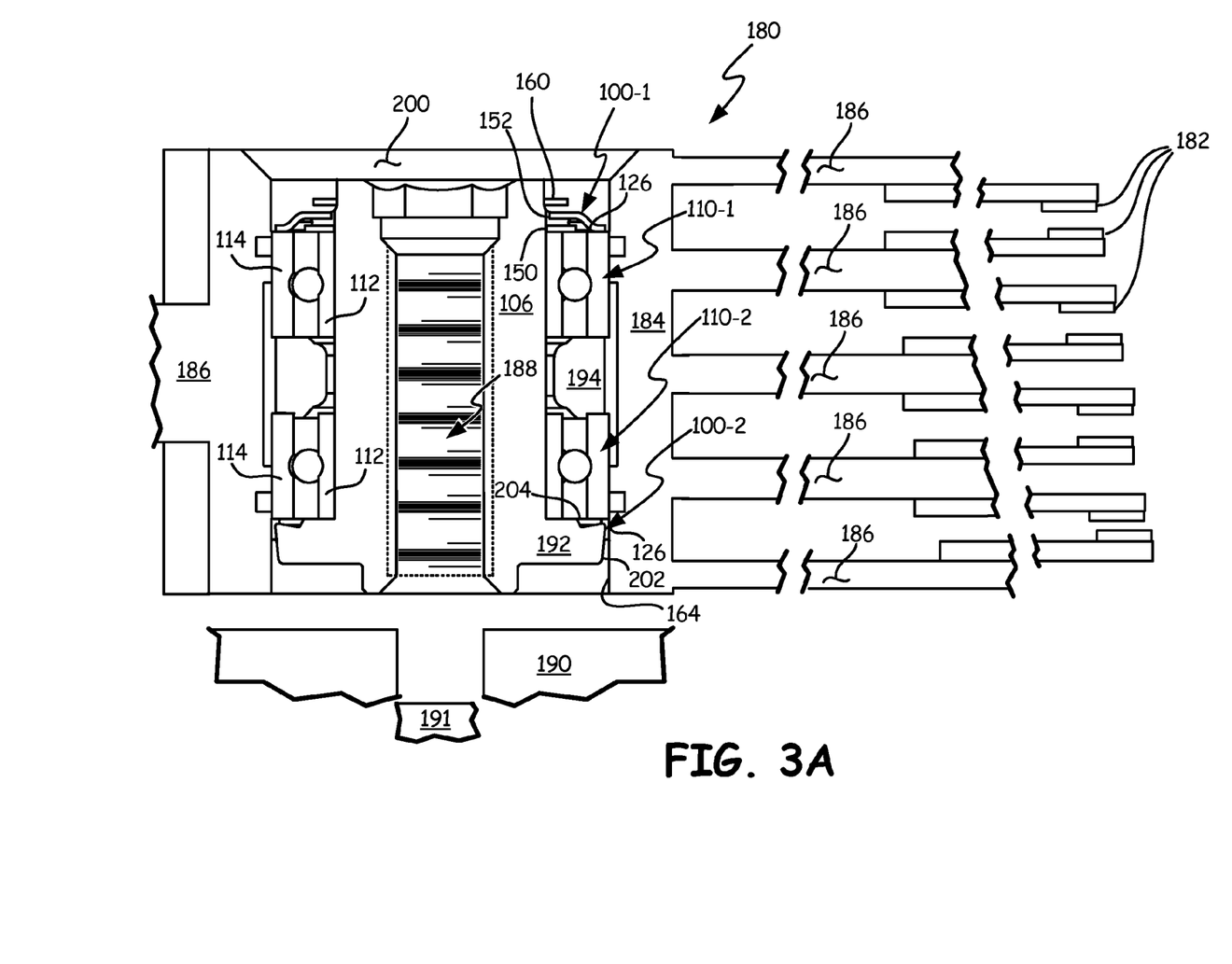
FIG. 3A illustrates an embodiment of a pivot assembly for heads of a data storage device including upper and lower fluid seals for a bearing structure of the pivot assembly.

FIG. 3A illustrates a pivot assembly 180 for one or more heads 182 of a data storage device including both upper and lower fluid seals 100-1, 100-2. In the illustrated embodiment, the pivot assembly 180 supports multiple heads 182 to read and/or write data to one or more discs (not shown). As shown, the outer structure of the assembly 180 includes a pivot block 184. The heads 182 are coupled to the pivot block 184 through arms 186 extending outwardly from the pivot block 184. The pivot block 184 rotates relative to the shaft 106 via upper and lower bearing units 110-1, 110-2 to position the heads 182 relative to data tracks on the one or more discs (not shown). The pivot block 184 includes a voice coil portion 186 (partially shown) that interfaces with a magnet assembly (not shown) to rotate the pivot block 184 about shaft 106 to position the heads 182 relative to data tracks between an inner diameter and outer diameter of the one or more discs (not shown). The voice coil motor rotates the pivot block 184 along an arcuate path having a pivot arc less than 360 degrees.

As shown, shaft 106 includes a threaded bore 188 to fasten the shaft 106 to a deck or base (shown schematically) 190 of a data storage device via fastener 191 so that the pivot block 184 rotates relative to the stationary shaft 106. In the illustrated embodiment, the shaft 106 includes a flange portion 192 extending outwardly from the shaft 106. As shown, lower bearing unit 110-2 is supported on an upper surface of the flange portion 192. A spacer ring 194 is supported on the lower bearing unit 110-2 and an upper bearing unit 110-1 is assembled on the spacer ring 194. In the embodiment shown, an upper fluid seal structure is assembled over the upper and lower bearing units 110-1, 110-2 and the pivot block 184 is disposed over the upper and lower bearing units 110-1, 110-2. A top plate 200 is disposed on the pivot block 184 and secured to the shaft 106 as shown. In the embodiment shown, the upper and lower bearing units 110-1, 110-2 are ball bearings wherein the rolling elements are balls rotatable between the inner and outer races 112, 114.

In the illustrated embodiment, the upper and lower fluid seals 100-1, 100-2 are provided in upper and lower passageways 126 formed via the upper and lower fluid seal structures to reduce outgassing and debris spillage into the disc drive. Thus as shown, the lower fluid seal 100-2 seals the lower bearing unit 110-2 and the upper fluid seal 100-1 seals the gap of the upper bearing unit 110-1.

In the illustrated embodiment, the upper and lower fluid seals 100-1, 100-2 include inner and outer capillary seals as previously described. The lower fluid seal includes an inner capillary seal proximate to an inlet to a lower passageway and an outer capillary seal at a passageway outlet along the upright surface 164 of the pivot block 184. The upper fluid seal similarly includes an inner capillary seal proximate to an inlet to an upper passageway and an outer capillary seal at an outlet axially and radially spaced from the inlet formed along the upright surface 164 of the pivot block 184. In the illustrated embodiment shown in FIG. 3A, the inner and outer capillary seals of the lower fluid seal 100-1 are formed along surfaces of the flange portion 192 of the shaft 106. The inner and outer capillary seals of the upper fluid seal 100-1 are formed along capillary surfaces of seal ring 150 and cap 152 similar to the embodiment previously described with reference to FIGS. 1C-1D.

Figure 3B:
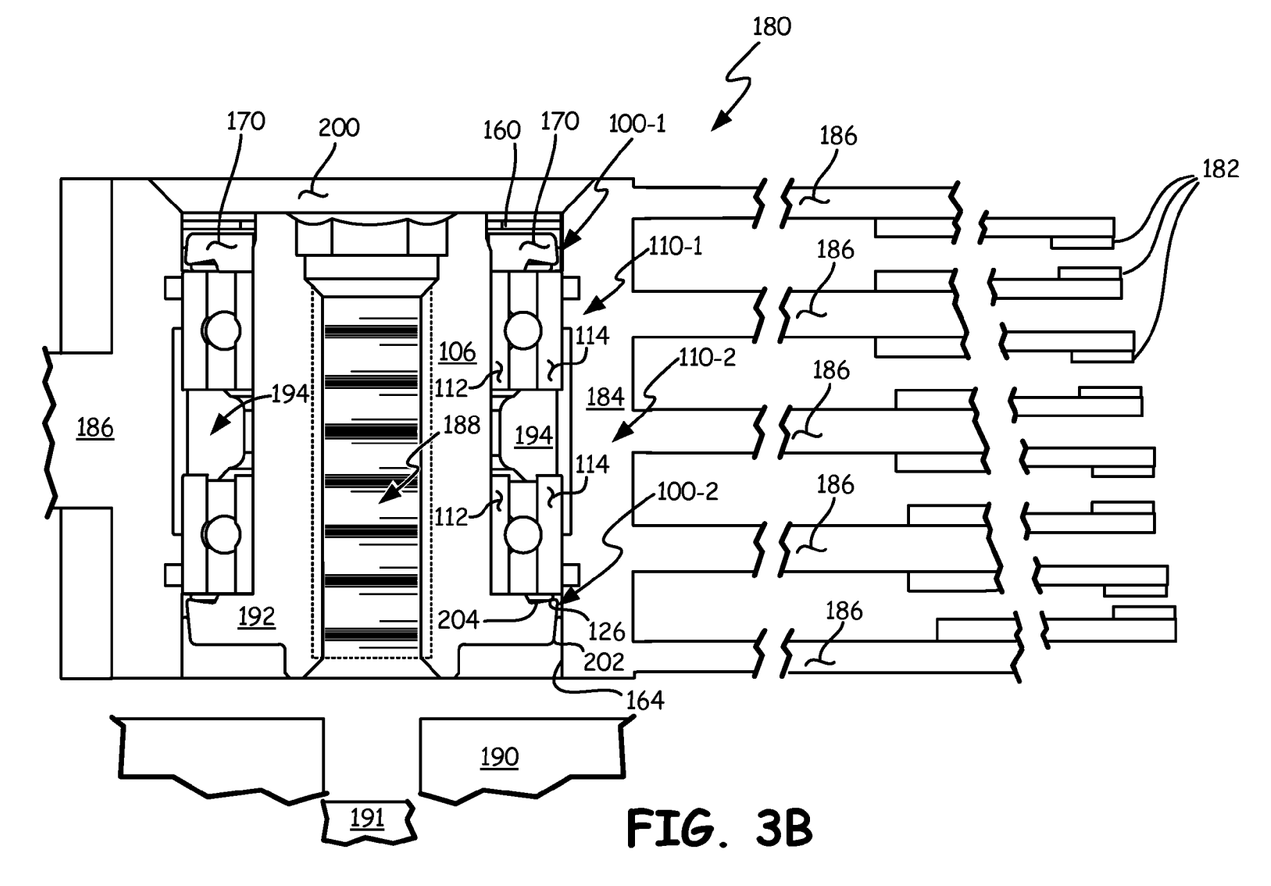
FIG. 3B illustrates an alternate embodiment of a pivot assembly for heads of a data storage device including upper and lower fluid seals for the bearing structure of the pivot assembly.

The flange portion 192 as shown includes an outer tapered perimeter surface 202 and tapered surface 204 to form the fluid seal structure and the inner and outer capillary surfaces of the fluid seal structure of the lower fluid seal 100-2. FIG. 3B illustrates another embodiment of a pivot assembly 180 including upper and lower fluid seals 110-1, 110-2. In the embodiment shown in FIG. 3B, the upper fluid seal 100-1 is formed along tapered surfaces of seal plate 170 as previously described with respect to FIGS. 2A-2B. The lower fluid seal 100-2 is formed along the tapered surfaces of the flange portion 192 as previously described with reference to FIG. 3A.

Figure 4:
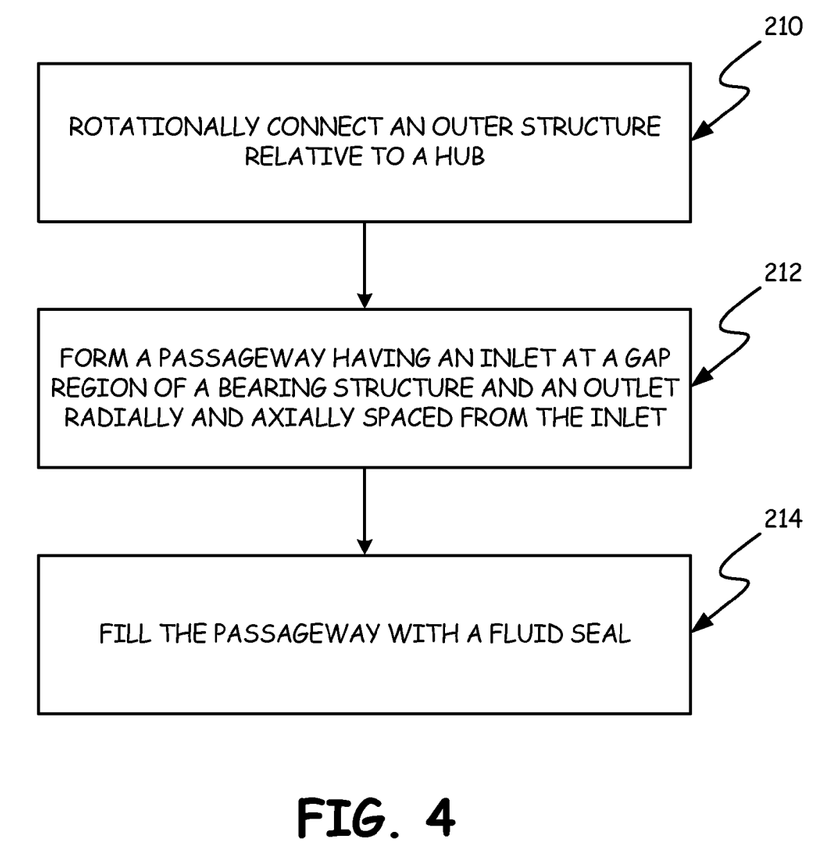
FIG. 4 is a flow chart illustrating assembly steps for embodiments of the fluid seal for a rotating assembly of the type generally described in the application.

FIG. 4 illustrates assembly of a bearing structure having a fluid seal for limiting outgasses of debris from the bearing structure 110. As shown in block 210, one or more bearing units are inserted over the shaft 106 to rotationally connect the outer structure 104 and the shaft 106. As illustrated in block 212, a passageway is formed that extends from an inlet to the gap region of the bearing structure to an outlet radially and axially spaced from the inlet. As shown in block 214, the passageway 126 is filled with a fluid to provide an inner capillary seal along a radial portion of the passageway 126 and an outer capillary seal along an axial portion of the passageway 126 radially and axially spaced from the inlet. Typically a small amount of fluid is deposited in the passageway through a needle to form the fluid seal in the passageway. The viscous fluid for the fluid seal is different from the lubricant or grease for the bearing structure.

In illustrated embodiments, the passageway 126 is formed along surfaces of a flange portion 192 of the shaft 106. Formation of the passageway along surfaces of the flange portion 192 reduces profile height requirements and assembly complexity. In illustrated embodiment, where the bearing structure includes upper and lower bearing units 110-1, 110-2, the lower bearing unit 110-2 is assembly on the flange portion 192 and the upper bearing unit 110-1 is inserted over the shaft on top of the spacer ring 194 separating the lower bearing unit 110-2 from the upper bearing unit 110-1. In illustrated embodiment, the passageway 126 for the fluid seal for the upper bearing unit 110-1 is formed via a fluid seal structure assembled over the upper bearing unit 110-1. Each of the upper and lower passageways is filled with fluid to form the upper and lower fluid seals 100-1, 100-2 for the bearing structure.

The method described has application for providing a low profile seal for a pivot assembly 180 for a data storage device. The low profile facilitates optimum spacing between upper and lower bearing units 110-1, 110-2 to reduce off-track displacement or movement for read and write operations. The low profile seal as described is formed via inner and outer capillary seals along inner and outer capillary surfaces. The capillary seals as described use surface friction and do not use a magnetic fluid nor magnetic elements to contain the fluid as in prior ferromagnetic seals.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application, while maintaining substantially the same functionality without departing from the scope and spirit of the present invention. In addition, although the embodiments described herein disclose a specific arrangement of parts, the arrangement of and specific components can be modified to form the passageway and inner and outer capillary seals as described without departing from the scope and spirit of the present invention.

What is claimed is:

1. A fluid seal for a bearing structure including one or more rollable elements rotationally connecting an outer structure to a shaft, the fluid seal comprising:
   an outer capillary seal and an inner capillary seal axially and radially spaced from the outer capillary seal and a fluid contained by the outer capillary seal and the inner capillary seal,
   wherein the fluid comprises a non-magnetic or non-ferromagnetic fluid, and
   wherein the outer capillary seal, the inner capillary seal and the fluid collectively form the fluid seal.

2. The fluid seal of claim 1 wherein the shaft is fixed to a base structure and the outer structure rotates relative to the shaft via rotation of the one or more rollable elements of the bearing structure.

3. The fluid seal of claim 1 wherein the one or more rollable elements of the bearing structure include a plurality of balls between an inner race and an outer race and the fluid seal seals a gap region between the inner race and the outer race.

4. The fluid seal of claim 1 wherein the fluid is contained between opposed transverse surfaces orientated in a radial direction and opposed upright surfaces orientated in an axial direction and the inner capillary seal is formed between the transverse surfaces and the outer capillary seal is formed between the upright surfaces.

5. The fluid seal of claim 1 wherein the fluid is contained along a passageway having opposed upright surfaces orientated in an axial direction and opposed transverse surfaces orientated in a radial direction and the inner capillary seal is formed between the transverse surfaces and the outer capillary seal is formed between the upright surfaces.

6. The fluid seal of claim 5 wherein one of the upright surfaces is formed along an outer surface of the shaft.

7. The fluid seal of claim 5 wherein one of the upright surfaces is formed along an inner surface of the outer structure.

8. The fluid seal of claim 1 wherein the bearing structure includes a lubricant material for the rollable elements and the lubricant material is different from the non-magnetic or non-ferromagnetic fluid.

9. The fluid seal of claim 1 wherein the inner and outer capillary seals and the fluid are contained along a passageway having a radial portion and an axial portion and the inner capillary seal is formed along an inner capillary surface along the radial portion of the passageway and the outer capillary seal is formed along an outer capillary surface along the axial portion of the passageway.

10. The fluid seal of claim 9 wherein the inner and outer capillary surfaces are formed along tapered surfaces of a fluid seal structure and the passageway is formed between the tapered inner capillary surface and an opposed transverse capillary surface and the tapered outer capillary surface and an opposed upright capillary surface.

11. An assembly comprising:
   a shaft;
   an outer structure;
   a bearing structure rotationally connecting the outer structure to the shaft;
   a fluid seal structure forming a passageway having an inlet open to a gap region of the bearing structure and an outlet radially and axially spaced from the inlet; and
   a fluid seal having an inner capillary seal at the inlet of the passageway and an outer capillary seal at the outlet of the passageway and a fluid contained along the passageway between the inner and outer capillary seals,
   wherein the fluid comprises a non-magnetic or non-ferromagnetic fluid, and
   wherein the outer capillary seal, the inner capillary seal and the fluid collectively form the fluid seal.

12. The assembly of claim 11 wherein the shaft is fixed to a base structure and the outer structure is a pivot block comprising:
   one or more arms having one or more heads coupled thereto; and
   a voice coil for a voice coil motor to position the one or more heads relative to one or more data tracks of a magnetic recording media.

13. The assembly of claim 11 wherein the passageway is formed between a tapered inner capillary surface and an opposed transverse capillary surface orientated in a radial direction and a tapered outer capillary surface and opposed upright capillary surface orientated in an axial direction.

14. The assembly of claim 13 wherein upright capillary surface is formed along an upright surface of the shaft or outer structure.

15. The assembly of claim 11 wherein the passageway includes a radial portion formed along an inner capillary surface and an axial portion formed along an outer capillary surface generally transverse to the inner capillary surface.

16. The assembly of claim 11 wherein the passageway is formed along inner and outer capillary surfaces on a flange portion of the shaft forming the fluid shield structure.

17. The assembly of claim 11 wherein the bearing structure includes upper and lower bearing units separated by a spacer ring and the assembly comprises upper and lower fluid seals formed via upper and lower fluid seal structures.

18. A method comprising:
   rotationally connecting an outer structure to a shaft through a bearing structure including one or more rollable elements;
   forming a passageway having an inlet opened to a gap region of the bearing structure and an outlet radially and axially spaced from the inlet; and
   filling the passageway with non-magnetic or non-ferromagnetic fluid to form an inner capillary seal along a transverse surface of a radial portion of the passageway proximate to the inlet and an outer capillary seal along an upright surface of an axial portion of the passageway proximate to the outlet and the fluid is contained between the inner and outer capillary seals.

19. The method of claim 18 wherein the step of forming the passageway comprises:
   forming a lower passageway between a flange portion of the shaft and lower upright and transverse surfaces spaced from the flange portion of the shaft;
   assembling a fluid seal structure over the bearing structure to form an upper passageway between the fluid seal structure and upper upright and transverse surfaces spaced from the fluid seal structure; and
   filling the upper and lower passageways with the non-magnetic or non-ferromagnetic fluid to form the upper and lower fluid seals.

20. The method of claim 19 wherein the upper and lower upright surfaces are formed along the outer structure or shaft and extend in an axial direction and the upper and lower transverse surfaces are generally perpendicular to the upper and lower upright surfaces.

\* \* \* \* \*